United States Patent Office 3,471,496
Patented Oct. 7, 1969

3,471,496
PROCESS FOR PREPARING
TETRABROMOPYRAZINE
Alin H. Gulbenk, Walnut Creek, Calif., assignor to The Dow Chemical Company, Midland, Mich., a corporation of Delaware
No Drawing. Filed July 23, 1968, Ser. No. 746,731
Int. Cl. C07d 51/76; A01n 9/22
U.S. Cl. 260—250                                    5 Claims

ABSTRACT OF THE DISCLOSURE

Tetrabromopyrazine is prepared by the reaction of a tetrahalopyrazine such as tetrachloropyrazine with hydrogen bromide at temperatures of from about 75° to 200° C. and in an inert solvent such as glacial acetic acid. Tetrabromopyrazine has utility as a pesticide and is effective in the control of a variety of bacterial and fungal organisms.

Background of the invention

U.S. Patent No. 2,573,268 discloses the preparation of tetrabromopyrazine by the direct bromination of monobromopyrazine. The reaction produces substantial amounts of dibromopyrazine isomers and tribromopyrazine, with but little tetrabromopyrazine being produced. The patent notes that higher halogenation favors the production of the tetrasubstituted product in the case of chlorine and the tri-substituted product in the case of bromine. It is an object of this invention to provide an efficient process for preparing the tetra-substituted bromine product in high yields.

The tetrachloropyrazine starting material utilized in the present invention can be prepared by a method described in the specification and single example of U.S. Patent No. 2,442,473, wherein a vaporous mixture of pyrazine and water is reacted with chlorine at temperatures of about 375° to 400° C.

Summary of the invention

The present invention is directed to a method useful for the production of tetrabromopyrazine which comprises the step of reacting hydrogen bromide with a tetrahalopyrazine wherein one of the halogen substituents is chlorine and the remaining three halogen substituents are selected from chlorine and bromine. More particularly, the invention is directed to a process which comprises contacting hydrogen bromide with a tetrahalopyrazine at a temperature between about 75° and about 200° C. and in the presence of an inert organic liquid medium, at least one molar proportion of hydrogen bromide being employed for each atomic proportion of chlorine in the tetrahalopyrazine starting material.

Tetrabromopyrazine is a white crystalline solid melting at about 152°–154° C. It is slightly soluble in water and of varying degrees of solubility in organic solvents such as acetone, benzene, chloroform or diethyl ether. Tetrabromopyrazine is useful as an antimicrobial agent.

The term "tetrahalopyrazine" is employed in the present specification and claims to means one or more tetrahalogen substituted pyrazine wherein one halogen substituent is chlorine and the remaining three substituents are chlorine or bromine. The term thus specifically includes tetrachloropyrazine, bromotrichloropyrazine, dibromodichloropyrazine, chlorotribromopyrazine and mixtures thereof.

The phrase "atomic proportion of chlorine in the tetrahalopyrazine" refers to the number of chlorine substituents in the tetrahalopyrazine, for example one molar proportion of tetrachloropyrazine contains four atomic proportions of chlorine, one molar proportion of bromotrichloropyrazine contains three atomic proportions of chlorine, and so on. The preferred tetrahalopyrazine starting material is tetrachloropyrazine.

The reaction of the hydrogen bromide with the tetrahalopyrazine takes place with the evolution of heat and hydrogen chloride of reaction and is carried out in the presence of an inert polar organic liquid which is not detrimentally reactive with the tetrahalopyrazine or hydrogen bromide reactants or with the tetrabromopyrazine product. Representative inert polar organic liquids which can be employed as reaction media include carboxylic acids of from 1 to 12 carbon atoms, inclusive, and mono-, di- and trichlorinated and brominated derivatives thereof such as formic acid, glacial acetic acid, propionic acid, butyric acid, chloroacetic acid, dibromoacetic acid, trichloroacetic acid, chloropropionic acid, bromoacetic acid, trichlorobutyric acid, pivalic acid, 3-methyl-2-phenyl-butyric acid, as well as organic sulfonic acids, halobenzenes, nitrobenzene, nitroparaffins, aldehydes, ketones, halogenated hydrocarbon solvents and mixtures of two or more such inert polar organic liquids.

It is critical and essential for the practice of the present method that the reactants be contacted at a temperature of from about 75° to about 200° C. While hydrogen bromide will react with a dispersion of a tetrahalopyrazine such as tetrachloropyrazine at temperatures substantially below 75° C. such as from room temperature to about 65° C., the amount of tetrabromopyrazine formed is relatively small, the more significant products being the mono-, di- and tribromo-substituted tetrahalopyrazine starting materials. Temperatures substantially higher than about 200° C. such as from 210° to 225° C. for any appreciable time period should be avoided in order to produce tetrabromopyrazine in good yields and substantially free of other materials and degradation products. In the process of the invention, by employing the critical reaction temperatures of from 75° to about 200° C., excellent yields of tetrabromopyrazine product are obtained substantially free of other materials.

The proportions of the reactants to be employed are also critical and essential to the production of high yields of tetrabromopyrazine by the method of the invention. The reaction consumes one molar proportion of hydrogen bromide for every atomic proportion of chlorine in the tetrahalopyrazine starting material employed. For example, the reaction consumes four moles of the hydrogen bromide reactant for each mole of tetrachloropyrazine which is converted to tetrabromopyrazine, three moles of hydrogen bromide for each mole of bromotrichloropyrazine, two moles for each mole of dibromodichloropyrazine and one mole for each mole of tribromochloropyrazine. The use of less than one molar proportion of hydrogen bromide for each atomic proportion of chlorine in the tetrahalopyrazine starting material results in substantially lower yields of the desired tetrabromopyrazine product and production of partially brominated tetrahalopyrazine starting materials such as tribromochloropyrazine, dibromodichloropyrazine and bromotrichloropyrazine. It is thus critical and essential that at least one molar proportion of hydrogen bromide be employed for each atomic proportion of chlorine in the tetrahalopyrazine starting material. In the preferred procedure, excess hydrogen bromide, that is, more than one molar proportion of hydrogen bromide per atomic proportion of chlorine, is employed. The exact amount of hydrogen bromide to be employed in excess of the required amount is not critical and excellent results are obtained with from 2-fold to 5-fold to 100-fold or greater excesses of hydrogen bromide.

The contacting of the reactants and the heating thereof at a temperature within the reaction temperature range can be accomplished in any order or fashion. For example, the reactants and the inert polar organic liquid can be separately heated to a temperature between about 75° and about 200° C. and then contacted and mixed in any order. Alternatively, one of the reactants can be dispersed in the inert polar organic liquid and heated at a temperature within the reaction temperature range, after which the other reactant is contacted and mixed with the heated dispersion. In the latter procedure, the reactant contacted with the heated dispersion can be heated to a temperature within the reaction temperature range prior to such contacting or it can be heated by contact with the heated dispersion. Also, the tetrahalopyrazine reactant can be contacted with the entire required amount of hydrogen bromide directly or the tetrahalopyrazine reactant can be contacted with the required amount of hydrogen bromide portionwise or by continuous addition of hydrogen bromide to the reaction mixture.

In a preferred procedure, the tetrahalopyrazine reactant is dispersed in the inert polar organic liquid and the resulting dispersion is heated while the hydrogen bromide reactant is contacted therewith by continuously bubbling gaseous hydrogen bromide into the heated dispersion until the reaction is substantially complete. In such procedure, the liquid reaction mixture remains essentially saturated with hydrogen bromide as the reaction progresses.

The term "dispersion" is employed herein to include those systems wherein the tetrahalopyrazine or hydrogen bromide is present in solution as well as those wherein it is present in a separate phase, generally in finely divided form.

The reaction pressures are not critical and good results can be obtained at elevated or reduced pressures as well as at atmospheric pressure which are preferred. However, when the inert polar organic liquid employed boils at a temperature below the desired reaction temperature, the process is preferably conducted under an elevated pressure sufficient to maintain the reaction mixture in liquid state. The reaction is generally complete in from about 2 to about 12 hours. When the reaction is complete, the product is conveniently recovered by conventional procedures such as distilling off the solvent or by diluting the reaction mixture with water to precipitate the product as a solid which can then be recovered by filtration, decantation or the like. The tetrabromopyrazine product can then be purified by the use of conventional techniques such as recrystallization or washing.

In a convenient procedure for carrying out the process according to the present invention, a tetrahalopyrazine, preferably tetrachloropyrazine, is dispersed in an inert polar organic liquid and preferably dissolved therein. Gaseous anhydrous hydrogen bromide is then passed into the resulting dispersion, preferably by bubbling the hydrogen bromide gas upwardly through the mixture with stirring. The reaction mixture is heated at a temperature within the reaction temperature range and the heating and addition of excess hydrogen bromide are continued until the reaction is complete. A gaseous effluent stream made up essentially of excess hydrogen bromide and hydrogen chloride of reaction is removed from the liquid reaction mixture as the reaction proceeds and may be recycled, if desired, preferably admixed with added hydrogen bromide. The progress of the reaction can be followed by conventional procedures such as measuring the amount of hydrogen chloride of reaction, or by periodic gas liquid chromatographic analyses of aliquots of the reaction mixture. When the reaction is complete, the tetrabromopyrazine product is conveniently separated by cooling the reaction mixture and mixing the cooled mixture with water to precipitate the product which is then isolated by conventional techniques such as filtration, centrifugation or decantation. The product can be purified by conventional procedures such as recrystallization and washing. For example, the solid product can be dissolved in benzene after which a purified tetrabromopyrazine product can be precipitated out by the addition of hexane. Any partially brominated chloropyrazine compounds obtained can be employed again as starting materials, either as such or in admixture with tetrachloropyrazine.

Any suitable reactor can be employed for contacting and heating the reactants, and since the reaction is somewhat exothermic, strong heating may be required only at the initiation of the reaction. Thereafter, heat is usually applied only as required to maintain the reaction mixture at the desired temperature. Accordingly, the reactor should be provided with a heating coil or other heating means so as to bring the liquid reaction mixture up to the reaction temperatures as rapidly as possible. The inlets, outlets and interior surfaces of the reactor must be of materials such as are known to resist corrosion by hydrogen bromide and hydrogen chloride at the moderately high temperatures employed in this reaction. Thus, such surfaces may be lined with nickel, carbon, silica or glass. In practice, it has been found that thermally resistant, high-silica glass such as Vycor brand is satisfactory for small reaction systems. In large scale apparatus, it is convenient to employ a shell of nickel lined with fused silica or a suitable refractory material such as carbon.

In following the progress of the reaction, it is convenient to subject a sample of the reaction mixture to vapor phase chromatographic analysis from time to time. During the early phases of the reaction, such analysis shows a peak for the tetrahalopyrazine starting material and for each of the mono-, di- and tribromo-substituted pyrazine intermediates, with a peak for the tetrabromopyrazine product developing as the reaction progresses. When this tetrabromopyrazine peak is essentially the only one present, the reaction can be considered complete. For such analysis, a chromatographic column containing Dow Corning Silicone Oil 710 is conveniently employed.

Description of the preferred embodiments

In a representative operation, 100 milliliters of glacial acetic acid are added to 10 grams (0.046 mole) of tetrachloropyrazine in a round-bottom flask equipped with a condenser and the resulting mixture is stirred to disperse the tetrachloropyrazine in the glacial acetic acid. Gaseous, anhydrous hydrogen bromide is bubbled through the stirred dispersion in the flask for several minutes, during which time the temperature of the solution rises to 40° C. The reaction mixture is then heated at the boiling temperature (about 118.5° C.) under reflux and excess hydrogen bromide is passed through the mixture for 7.5 hours. Periodic sampling of the solution for vapor phase chromatographic analysis during the reaction period indicates the reaction to be complete after the 7.5 hours' heating period. The reaction mixture is then cooled, whereupon a crystalline solid precipitates. The crystalline precipitate is separated by decantation, washed and dried and the tetrabromopyrazine product is found by elemental analysis to have carbon, bromine and nitrogen contents of 12.07, 80.92 and 6.98 percent, respectively, as against the theoretical contents of 12.1, 80.6 and 7.07 percent for the named product. A second batch of tetrabromopyrazine product is separated by mixing the remaining reaction mixture with water, whereupon the tetrabromopyrazine product precipitates, and then recovering the solid precipitate by filtration. The batches of tetrabromopyrazine product are combined, recrystallized from benzene by the addition of hexane and found to melt at 152°–154° C. The total yield of tetrabromopyrazine is calculated to be 95 percent of that theoretically obtained, based upon the amount of tetrachloropyrazine employed.

In a similar operation, excellent yields of tetrabromopyrazine are obtained when excess hydrogen bromide is bubbled through a mixture of equal parts of tetrachloropyrazine, 2 - bromo - 3,5,6 - trichloropyrazine and 2,6-dibromo-3,5-dichloropyrazine with a minor amount of 2-chloro-3,5,6-tribromopyrazine dispersed in chloroacetic acid for about 4.5 hours while the mixture is heated at a temperature of about 175° C.

In a further similar operation, excellent yields of tetrabromopyrazine are obtained when excess hydrogen bromide is bubbled through a dispersion of 2-bromo-3,5,6-trichloropyrazine in propionic acid for about six hours while the mixture is heated at a temperature of about 140° C.

The tetrabromopyrazine product is a useful bactericide and fungicide when applied in effective antimicrobial amounts to a variety of bacterial and fungal organisms or to their habitats.

In representative operations, tetrabromopyrazine is dispersed in warm melted nutrient agar which is then poured into petri dishes and allowed to solidify. The tetrabromopyrazine is employed at a rate sufficient to provide 100 parts by weight thereof per million parts of ultimate agar composition. The surface of the agar is then inoculated with a variety of bacterial and fungal test organisms, and the inoculated plates are incubated under conditions conducive to bacterial and fungal growth. Similar check plates in which the agar contains no tetrabromopyrazine are similarly inoculated and incubated. In such operations, 100 percent inhibition and control of the organisms *Pseudomonas aeruginosa, Staphylococcus aureus, Candida albicans, Bacillus subtilis, Candida pelliculosa, Pullularia pullulans* and *Pseudomonas* spp.—strain 10 is observed with the plates containing 100 parts per million of tetrabromopyrazine. Abundant growth of all the test organisms is observed with the check plates.

I claim:
1. A method which comprises contacting hydrogen bromide with at least one tetrahalopyrazine selected from the group consisting of tetrachloropyrazine, bromotrichloropyrazine, dibromodichloropyrazine and chlorotribromopyrazine at a temperature of from about 75° to about 200° C. in the presence of an inert polar organic liquid, at least one molar proportion of hydrogen bromide being employed for each atomic proportion of chlorine in the tetrahalopyrazine.

2. The method of claim 1 wherein the reactants are contacted at a temperature of from about 100° to about 175° C.

3. The method of claim 1 wherein the liquid is glacial acetic acid.

4. The method of claim 1 wherein the tetrahalopyrazine is tetrachloropyrazine.

5. The method of claim 1 wherein excess hydrogen bromide is contacted with the tetrahalopyrazine.

References Cited

UNITED STATES PATENTS 2,524,431  10/1950  Dixon et al. _____ 260—250
2,573,268  10/1951  Miller _____ 260—250

NICHOLAS S. RIZZO, Primary Examiner

U.S. Cl. X.R.
260—999